United States Patent
Whited et al.

(10) Patent No.: US 8,115,797 B2
(45) Date of Patent: *Feb. 14, 2012

(54) NETWORK-ENABLED PEER-TO-PEER VIDEO CALLING SYSTEMS, METHODS, AND STORAGE MEDIUM

(75) Inventors: William Whited, Atlanta, GA (US); Randy Zimler, Gainsville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 521 days.

This patent is subject to a terminal disclaimer.

(21) Appl. No.: 12/268,755

(22) Filed: Nov. 11, 2008

(65) Prior Publication Data
US 2009/0058983 A1   Mar. 5, 2009

Related U.S. Application Data

(63) Continuation of application No. 10/745,250, filed on Dec. 22, 2003, now Pat. No. 7,450,147.

(51) Int. Cl.
*H04N 7/14* (2006.01)

(52) U.S. Cl. ............... 348/14.01; 348/14.02; 348/14.12

(58) Field of Classification Search .... 348/14.01–14.16; 379/90.01, 93.28, 93.33; 370/260–261, 230, 370/232; 725/116, 146, 147
See application file for complete search history.

(56) References Cited

U.S. PATENT DOCUMENTS 6,222,841 B1 * 4/2001 Taniguchi ...................... 370/389
6,278,478 B1 * 8/2001 Ferriere ........................ 348/14.1

FOREIGN PATENT DOCUMENTS

| JP | 7030870 | | 1/1995 |
| JP | 10190765 A | * | 7/1998 |
| JP | 11289441 | | 10/1999 |
| JP | 11341105 A | * | 12/1999 |
| JP | 2003283695 A | * | 10/2003 |
| JP | 2003348556 A | * | 12/2003 |

* cited by examiner

*Primary Examiner* — Melur Ramakrishnaiah
(74) *Attorney, Agent, or Firm* — Cantor Colburn LLP

(57) ABSTRACT

Systems, methods, and a storage medium for peer-to-peer video calling between first and second devices is provided. The method includes determining a predetermined data communication rate by querying a communication network operably associated with the first and second devices. The method further includes transmitting video calling data from the first device through the communication network to the second device at substantially the predetermined data communication rate.

19 Claims, 10 Drawing Sheets

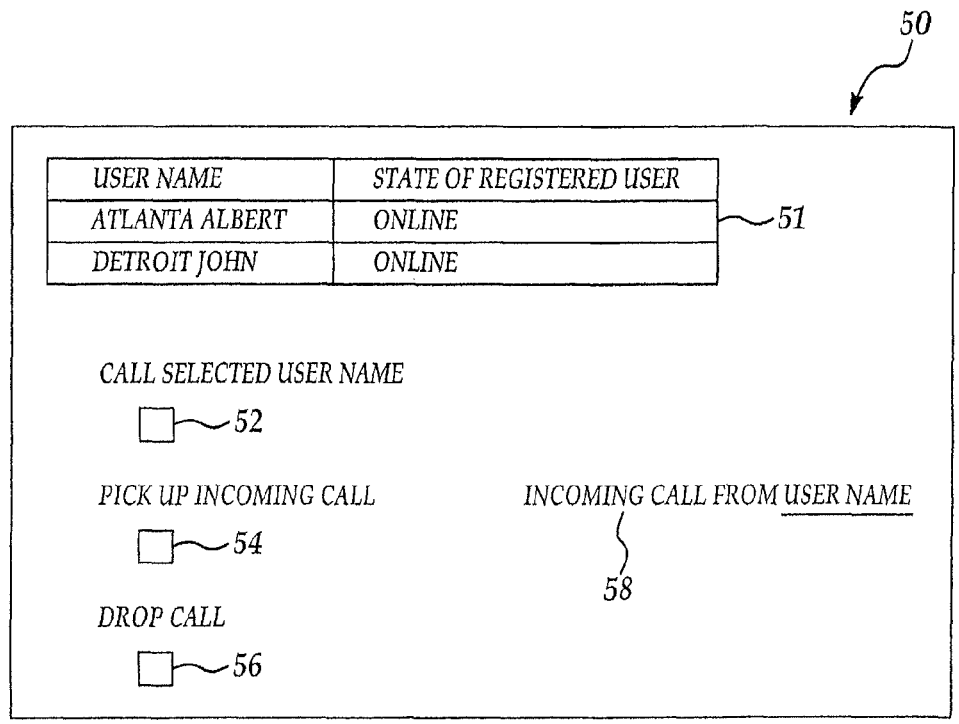

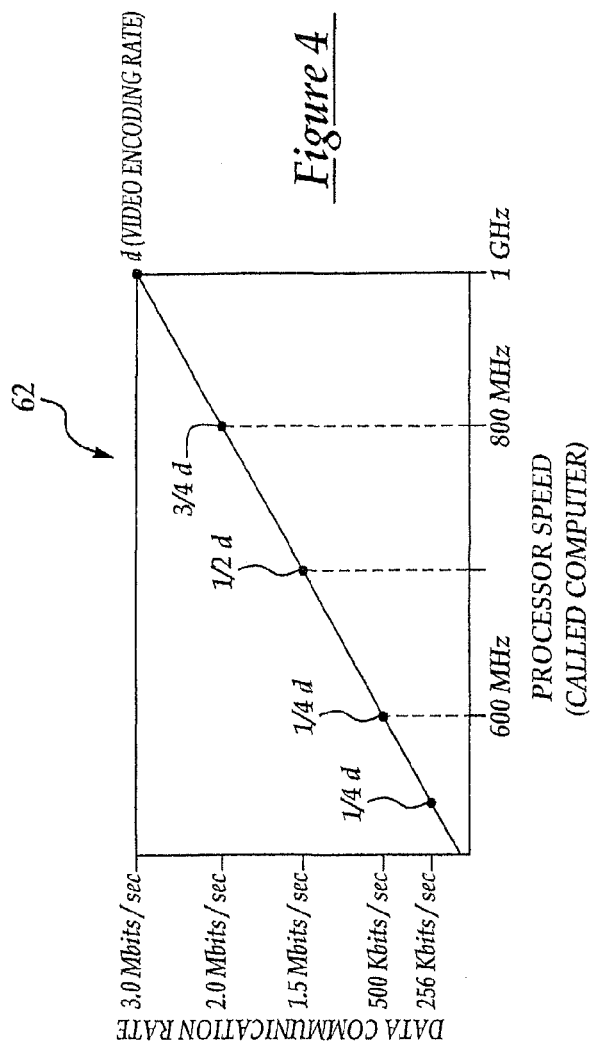

400 x 480 PIXELS
~ 300 Kb/s 1600 x 1200 PIXELS
~ 1.5 Mb/s

NETWORK-ENABLED PEER-TO-PEER VIDEO CALLING SYSTEMS, METHODS, AND STORAGE MEDIUM

CROSS-REFERENCE TO RELATED APPLICATIONS

This application is a continuation of U.S. patent application Ser. No. 10/745,250 filed Dec. 22, 2003, the contents of which are incorporated by reference herein in their entirety.

FIELD OF INVENTION

The present invention relates to peer-to-peer video calling systems, methods, and a storage medium.

BACKGROUND

Voice calling systems generally utilize at least two personal computers (PCs) communicating through a communication network. In particular, a first PC may send a stream of video calling data through the communication network to a second PC. The first PC, however, sends out the video calling data at a communication rate without having any knowledge of the communication rate capability (e.g., data transfer rate or data routing rate) of the communication network. Accordingly, when the first PC is transmitting video calling data to the communication network faster than the network can adequately route the data, a network element in the communication network may try to store some of the video calling data in a short-term memory buffer. However, network elements generally have limited memory to store the overflow of video calling data and when the memory buffer is completely utilized, the network elements purge the data. Accordingly, the second PC may receive only portions of the video calling data stream such that video images displayed on the second PC appear "choppy" or discontinuous. Further, because the video calling data being transmitted through the communication network does not have "priority routing status", portions of the video calling data stream may reach the second PC in an untimely manner, resulting in video images that appear "choppy" or discontinuous.

SUMMARY OF THE INVENTION

The foregoing problems and disadvantages are overcome by systems, methods, and a storage media for peer-to-peer video calling.

A method for peer-to-peer video calling between first and second devices is provided. The method includes determining a predetermined data communication rate by querying a communication network operably associated with the first and second devices. The method further includes transmitting video calling data from the first device through the communication network to the second device at substantially the predetermined data communication rate.

A peer-to-peer video calling system is provided. The system includes first and second devices operatively communicating with one another through a communication network. The first device is configured to query at least one network element in the communication network to determine a predetermined data communication rate in the communication network. The first device is further configured to transmit video calling data through the communication network to the second device at substantially the predetermined data communication rate.

A storage medium encoded with machine-readable computer program code for peer-to-peer calling between first and second devices operatively associated with a communication network is provided. The storage medium includes instructions for causing at least one device operatively associated with the communication network to implement a method comprising determining a predetermined data communication rate by querying the communication network operably associated with the first and second devices, and, transmitting video calling data from the first device through the communication network to the second device at substantially the predetermined data communication rate.

Other systems, methods, and computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 2 is a schematic of a user interface screen utilized by a calling PC for peer-to-peer video calling.

FIG. 3 is a schematic of an exemplar data communication rate table that may be stored in first and second PCs in a peer-to-peer video calling system.

FIG. 4 is a schematic of a video encoding rate table.

FIG. 5 is a schematic of an IP packet.

DETAILED DESCRIPTION OF THE INVENTION

Figure 1:
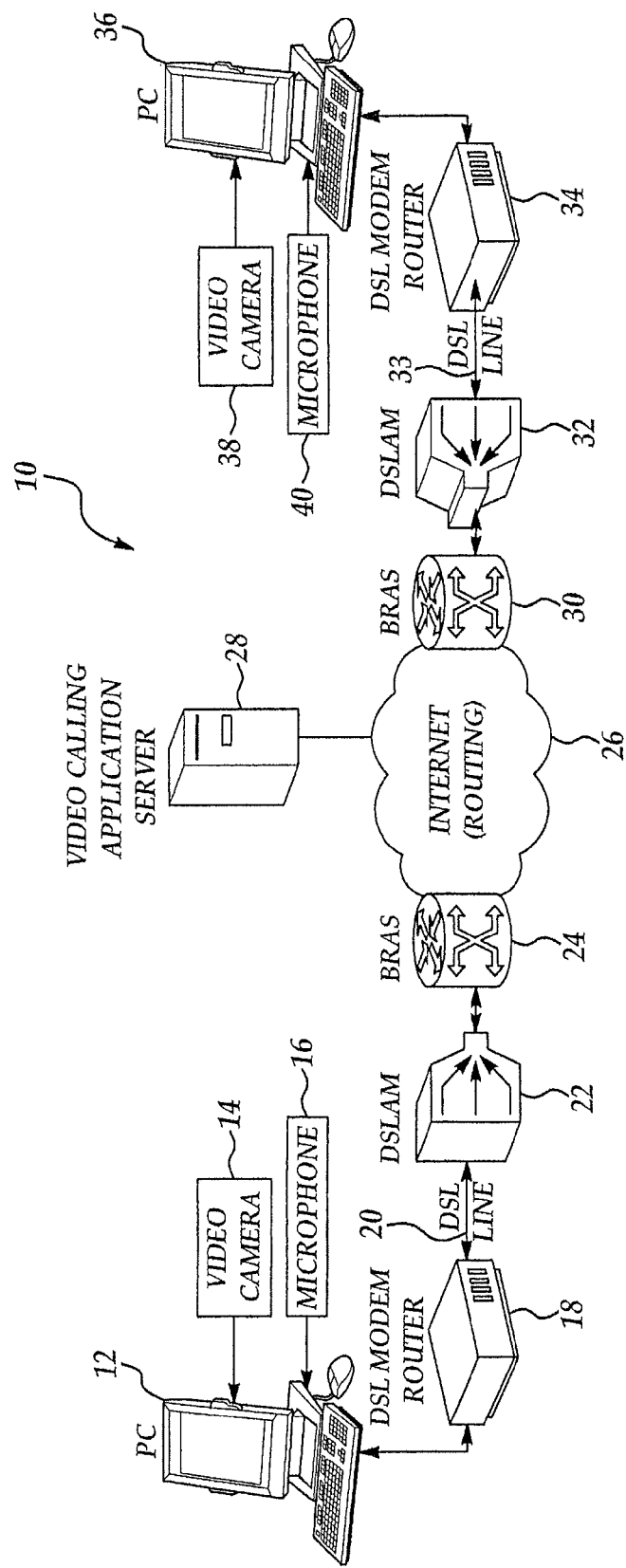
FIG. 1 is a schematic of a peer-to-peer video calling system.

Referring to the drawings, identical reference numerals represent identical components in the various views. Referring to FIG. 1, a peer-to-peer video calling system 10 is illustrated. System 10 may include a PC 12, a video camera 14, a microphone 16, a digital subscriber line (DSL) modem router 18, a digital subscriber line access multiplexer (DSLAM) 22, a broadband remote-access server (BRAS) 24, an Internet routing network 26, a video calling application server 28, a BRAS 30, a DSLAM 32, a DSL modem router 34, a PC 36, a video camera 38, and a microphone 40.

Video calling application server 28 is provided to provide video calling information to PCs 12, 36 to enable PCs 12, 36 to have video calling capability. In particular, the users of PC 12 and PC 36 may have a service contract with a service provider who provides video calling application server 28. Video calling application server 28 may have a memory (not shown) for storing a table containing (i) a list of user names having a service contract with the service provider associated with server 10 for video calling capability, and (ii) a state of the registered user (e.g., online or off-line). In particular, the table could contain for each user a "username" attribute and a "state of registered user" attribute. The "username" attribute corresponds to a unique identifier identifying a predetermined registered user. The "state of a registered user"

attribute indicates whether a PC associated with the user is in communication with video calling application server 28 and is available for receiving a video call.

PC 12 is provided for initiating and receiving video calls through network 10. PC 12 is operably coupled to video camera 14 and microphone 16. PC 12 receives a video signal from video camera 14 and an audio signal from microphone 16 and generates a first stream of video calling data based upon the video signal and the audio signal. PC 12 is further configured to determine a first desired data communication rate through the video calling system 10 based upon: (i) an upstream data communication rate for PC 12 and (ii) a downstream data communication rate for PC 36.

PC 36 is provided for initiating and receiving video calls through network 10. PC 36 is operably coupled to video camera 38 and microphone 40. PC 36 receives a video signal from video camera 38 and an audio signal from microphone 40 and generates a second stream of video calling data based upon the video signal and the audio signal. PC 36 is further configured to determine a second desired data communication rate through video calling system 10 based upon: (i) an upstream data communication rate for PC 36, and (ii) a downstream data communication rate for PC 12.

The method for determining the first and second desired data communications rates (or transmission rates) for PC 12 and PC 36, respectively, will now be explained. Because the data are communication rates through DSL lines 20, 33 are generally the most restrictive communication rates in system 10, the first and second desired data communication rates may be determined from the data communication rates through DSL lines 20, 33. Referring to FIG. 3, PC 12 and PC 36 may each have a memory (not shown) and that can store a table 60. Table 60 may include the following attributes: (i) upstream data communication rate, (ii) downstream data communication rate, and (iii) processor speed. The upstream data communication rate for PC 12 corresponds to the data communication rate between DSL modem router 18 and DSLAM 22 over DSL line 20, when transmitting data from PC 12 through router 18 to DSLAM 22. The upstream data communication rate for PC 36 corresponds to the data communication rate between DSL modem router 34 and DSLAM 32 over DSL line 33, when transmitting data from PC 36 through router 34 to DSLAM 32. The downstream data communication rate for PC 36 corresponds to the data communication rate between DSLAM 32 and DSL modem router 34 when transmitting data from DSLAM 32 to router 34. The downstream data communication rate for PC 12 corresponds to the data communication rate between DSLAM 22 and DSL modem router 18 when transmitting data from DSLAM 22 to router 18. For purposes of discussing table 60, PC 12 will be referred to the calling PC (e.g., the PC initiating a video call) and PC 36 will be referred to as the called PC (e.g., the PC initially receiving a video call). For example, PC 12 may have an upstream data communication rate of 500 Kbits/second and PC 36 may have a downstream data communication rate of 1.5 Mbits/second. Accordingly, the maximum rate that that data can be effectively transmitted from PC 12 to PC 36 is 500 Kbits/second. Thus, the desired data communication rate for transmitting data from PC 12 to PC 36 may be 500 Kbits/second. Alternately, PC 36 may have a downstream data communication rate of 2 Mbits/second and PC 12 may have an upstream data communication rate of 256 Kbits/second. Accordingly, the maximum communication rate the data can be effectively transmitted from PC 36 to PC 12 is 256 Kbits/second. Thus, the desired data communication rate for transmitting data from PC 36 to PC 12 may be 256 Kbits/second.

Referring to FIGS. 1 and 4, PC 12 and PC 36 are further provided to encode the first and second streams of video calling data, respectively from PCs 12, 36, utilizing known encoding algorithms during a video call. PC 12 and PC 36 may utilize a table 62 stored in internal memory (not shown) for determining a video encoding rate (d) of the first and second streams of video calling data, respectively. The first stream of video calling data would be transmitted from PC 12 through system 10 to PC 36. The second stream of video calling data would be transmitted from PC 36 through system 10 to PC 12. The video encoding rate (d=1) corresponds to a video encoding rate for obtaining full-motion, full-screen video presentation, with continuous audio presentation. A video encoding rate (d=¾) corresponds a video encoding rate for obtaining full-motion, full-screen video presentation, with continuous audio presentation. A video encoding rate (d=½) corresponds a video encoding rate for obtaining full-motion, partial-screen (e.g., reduced display window size) video presentation, with continuous audio presentation. A video encoding rate (d=¼) corresponds a video encoding rate for obtaining full-motion, partial-screen video presentation, with continuous audio presentation.

Referring to FIG. 4, PC 12 may utilize the first desired data communication rate and the processor speed of PC 36 to determine a video encoding rate. For example, PC 12 may determine that a first desired data communication rate should equal 500 Kbits/second and that the called PC 36 may have a processor speed of 600 Mhz. In this example, PC 12 could select a video encoding rate (d=¼) from table 62.

Similarly, PC 36 may utilize the second desired data communication rate and the processor speed of PC 12 to determine a second video encoding rate. For example, PC 36 may determine that a second desired data communication rate should equal 256 Kbits/second and that the calling PC 12 has a processor speed of 800 Mhz. In this example, PC 12 could also select a video encoding rate (d=¼) from table 62.

It should also be noted that both PC 12 and PC 36 can each utilize table 62 stored in a memory in each of PCs 12, 36 for determining a video decoding rate when receiving video calling data. Further, PC 12 can utilize a video decoding rate equal to the video encoding rate determined by PC 36, and vice versa.

PC 12 is further provided to generate a first plurality of IP packets containing the first stream of video calling data to be transmitted from PC 12 to PC 36. Referring to FIG. 5, a structure of an IP packet will now be explained. As shown, an IP packet may include the following attributes: (i) IP Version, (ii) IP Header Length, (iii) Precedence (also referred to Priority Routing Bits hereinafter), (iv) Type of Service, (v) Total IP Length, (vi) ID#, (vii) Fragment Area, (viii) Time to Live, (ix) Protocol, (x) Checksum, (xi) Source IP Address, (xii) Target IP Address (xiii) Data Bytes. PC 12 can generate IP packets that contain the video calling data and set the Priority Routing Bits in each of the IP packets to indicate a high priority routing level. Thus, downstream devices routing the IP packets will give high priority routing to the IP packets during routing thereof to substantially maintain a predetermined data communication rate through system 10. The encoded first stream of video calling data can be contained within the Data Bytes of one or more IP packets. An IP packet can contain up to 1500 data bytes. PC 12 can also receive a second plurality of IP packets containing the second stream of video calling data from PC 36 and generate the second stream of video calling data from the second plurality of IP packets.

Similarly, PC 36 is further provided to generate a second plurality of IP packets containing the second stream of video calling data to be transmitted from PC 36 to PC 12. PC 36 can also receive a first plurality of IP packets containing the first stream of video calling data from PC 12 and generate the first stream of video calling data from the first plurality of IP packets.

Referring to FIG. 2, a user interface 50 is illustrated that may be utilized by PC 12 for initiating a video call to PC 36. As shown, user interface 50 may include a menu 51 containing a list of registered user names and the calling states of the registered users. Interface 50 may further include a "Call Selected User Name" selection box 52 for allowing a user to call a specified user name selected in menu 51. Interface 50 may further include a "Pickup Incoming Call" selection box 54 for allowing a user to pick up an incoming call from a user identified in a message box 58. Interface 50 may further include a "Drop Call" selection box 56 for allowing a user to end a video call.

Figure 10:
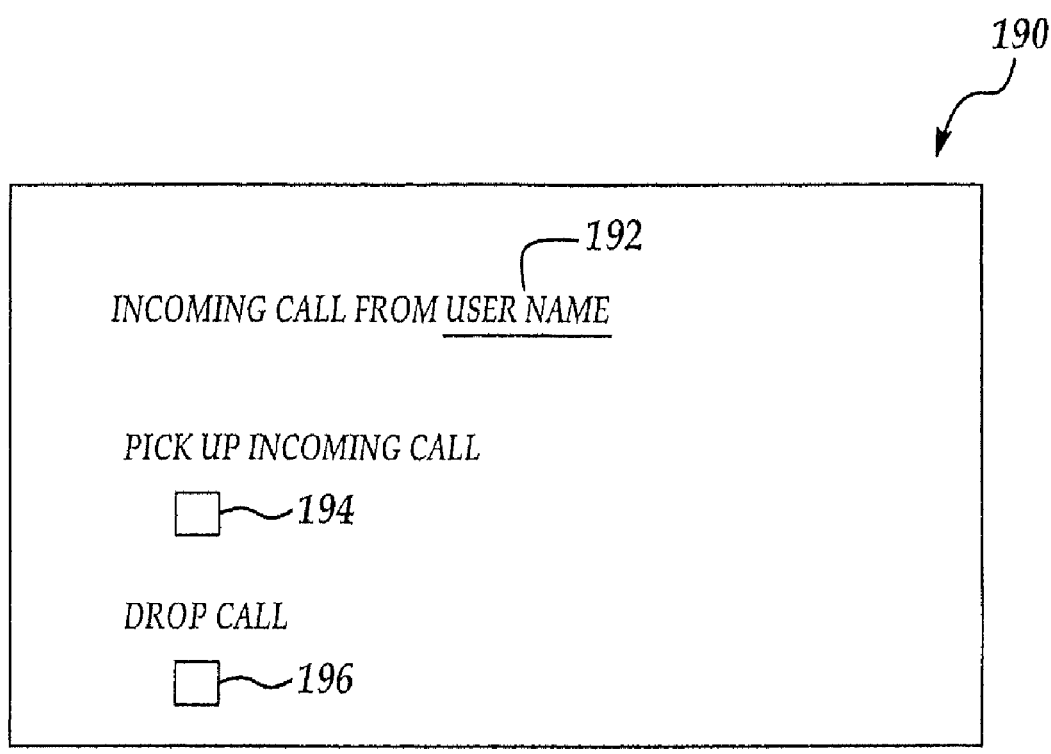
FIG. 10 is a schematic of a user interface screen utilized by a called PC for peer-to-peer video calling.

Referring to FIG. 10, a user interface 190 is illustrated that may be utilized by PC 36 for receiving a video call from PC 12. As shown, user interface 190 may include a "Pickup Incoming Call" selection box 194 for allowing a user to pick up an incoming call from a user identified in a message box 192. Interface 190 may further include a "Drop Call" selection box 196 for allowing a user to end a video call.

Referring to FIG. 1, DSL modem router 18 is operably coupled between PC 12 and DSLAM 22. Router 18 communicates to DSLAM 22 via DSL line 20. Router 18 and DSLAM 22 determine an upstream data communication rate and a downstream data communication rate during physical layer sync-up at modem initiation (e.g., modem power up). Thereafter, the upstream data communication rate and the downstream data communication rate are stored in a memory (not shown) of router 18. During a video call between PC 12 and PC 36, router 18 receives the first plurality of IP packets from PC 12 and enforces the quality of service (QoS) designated by the Priority Routing Bits to transmit the IP packets at a first predetermined data communication rate to DSLAM 22. Router 18 may further receive the second plurality of IP packets from DSLAM 22, generated by PC 36, and route the second plurality of IP packets to PC 12 at a second predetermined data communication rate.

DSLAM 22 is operably coupled between DSL modem router 18 and BRAS 24. DSLAM 22 may receive the first plurality of IP packets from DSL modem router 18 via DSL line 20 and transmit the first plurality of IP packets to BRAS 24 at a first predetermined data communication rate. Further, DSLAM 22 may receive the second plurality of IP packets from BRAS 24 and transmit the second plurality of IP packets to router 18 at a second predetermined data communication rate.

BRAS 24 is operably coupled between DSLAM 22 and Internet routing network 26. BRAS 24 may receive the first plurality of IP packets from DSLAM 22 and transmit the first plurality of IP packets through Internet routing network 26 to BRAS 30 at a first predetermined data communication rate. Internet routing network 26 contains devices recognizing class-based routing rules for IP packets and provides the first plurality of IP packets high routing priority based upon the value of the Priority Routing Bits. BRAS 24 may further receive the second plurality of IP packets from BRAS 30 and transmit the second plurality of IP packets to DSLAM 22 at a second predetermined data communication rate.

BRAS 30 is operably coupled between Internet routing network 26 and DSLAM 32. BRAS 30 may receive the first plurality of IP packets from Internet routing network 26 and transmit the first plurality of IP packets to DSLAM 32 at a first predetermined data communication rate. BRAS 30 may further receive the second plurality of IP packets from DSLAM 32 and transmit the second plurality of IP packets through Internet routing network 20 to BRAS 24 at a second predetermined data communication rate.

DSLAM 32 is operably coupled between DSL modem router 34 and BRAS 30. DSLAM 32 may receive a first plurality of IP packets from BRAS 30 and transmit the first plurality of IP packets to DSL modem router 34 via DSL line 33 at a first predetermined data communication rate. DSLAM 32 may further receive the second plurality of IP packets from DSL modem router 34 via DSL line 33 and transmit the second plurality of IP packets to BRAS 30 at a second predetermined data communication rate.

DSL modem router 34 is operably coupled between PC 36 and DSLAM 32. Router 34 communicates with DSLAM 32 via DSL line 33. An upstream data communication rate and a downstream data communication rate is determined by router 34 and DSLAM 32 during physical layer sync-up at modem initiation (e.g., modem power up). Thereafter, the upstream data communication rate and the downstream data communication rate are stored in a memory (not shown) of router 34. During a video call between PC 12 and PC 36, router 34 receives the first plurality of IP packets from PC 12 and enforces the quality of service (QoS) designated by the Priority Routing Bits to transmit the IP packets at a first predetermined data communication rate to PC 36. Router 34 may further receive the second plurality of IP packets from PC 36 and route the second plurality of IP packets to DSLAM 32 at a second predetermined data communication rate.

Referring to FIGS. 8A-8C and FIGS. 9A-9B, a method 100 for peer-to-peer video calling will now be explained. For purposes of discussion, the method will be explained by specifying PC 12 as the "calling PC" and PC 36 as the "called PC." It should be understood, however, that either PC 12 or PC 36 could initiate a video call to the other PC. Further, it should be understood that in an alternate embodiment, one or more of PC's 12, 36 could be replaced with a set-top box (not shown) with the video calling data being displayed on a monitor or a TV operably coupled to the set-top box.

At step 102, PC 12 sends a request to DSL modem router 18 requesting a first upstream data communication rate and a first downstream data communication rate associated with router 18.

At step 104, DSL modem router 18 sends a message to PC 12 including: (i) the first upstream data communication rate, and (ii) the first downstream data communication rate.

At step 106, a user of PC 12 logs into video calling application server 28 and PC 12 sends a message to server 28 including: (i) a username, (ii) the first upstream data communication rate, (iii) the first downstream data communication rate, (iv) a processor speed of PC 12.

At step 108, video calling application server 28 sends a message to PC 12 including: (i) listing of registered users, (ii) calling status of registered users.

At step 110, the user of PC 12 selects one of the registered users in menu 51 of user interface 50, to video call, and PC 12 sends a selection message identifying the selected registered user to server 28.

Video calling application server 28 sends a message to PC 12 including: (i) IP address of selected registered user, (ii) a second upstream data communication rate associated with DSL modem router 34, (iii) a second downstream data communication rate associated with router 34, (iv) a processor speed of PC 36.

At step 114, PC 12 sends a "video call request message" through system 10 to PC 36.

At step 116, PC 36 sends a "call request acknowledgment message" through system 10 to PC 12.

At step 118, PC 36 makes a determination as to whether the user of PC 36 has selected to either: (i) accept the video call, or (ii) to drop the video call. If the user selects to accept the video call, the method advances to step 120 where PC 36 sends a first "call set up message" through system 10 to PC 12. Otherwise, if the user selects to drop the call, the method advances to step 124.

At step 124, PC 36 sends a "drop message" through system 10 to PC 12. In response, at step 126, PC 12 sends a "drop acknowledgment message" through system 10 to PC 36 and the method 100 is exited.

After step 128, at step 130, PC 36 sends a "call progression acknowledgment message" to PC 12.

At step 132, PC 12 sends a first stream of video calling data through system 10 to PC 36.

At step 134, PC 36 sends a second stream of video calling data through system 10 to PC 12.

At step 136, PC 12 makes a determination as to whether a user of PC 12 has selected to drop the video call. If the user has selected to drop the video call, the method performs steps 138, 140. Otherwise, the method advances to step 142.

At step 138, PC 12 sends a "drop message" through system 10 to PC 36. In response, at step 140, PC 36 sends a "drop acknowledgment message" through system 10 to PC 12. After step 140, and the method 100 is exited.

Referring to step 136, if the user did not select to drop the call the method advances to step 142. At step 142, PC 36 makes a determination as to whether a user of PC 36 has selected to drop the video call. If the user has selected to drop the video call, the method performs steps 144, 146. Otherwise, the method returns to step 132.

At step 144, PC 36 sends a "drop message" through system 10 to PC 12.

At step 146, PC 12 sends a "drop acknowledgment message" through system 10 to PC 36. After step 146, the method 100 is exited.

Figure 9A:
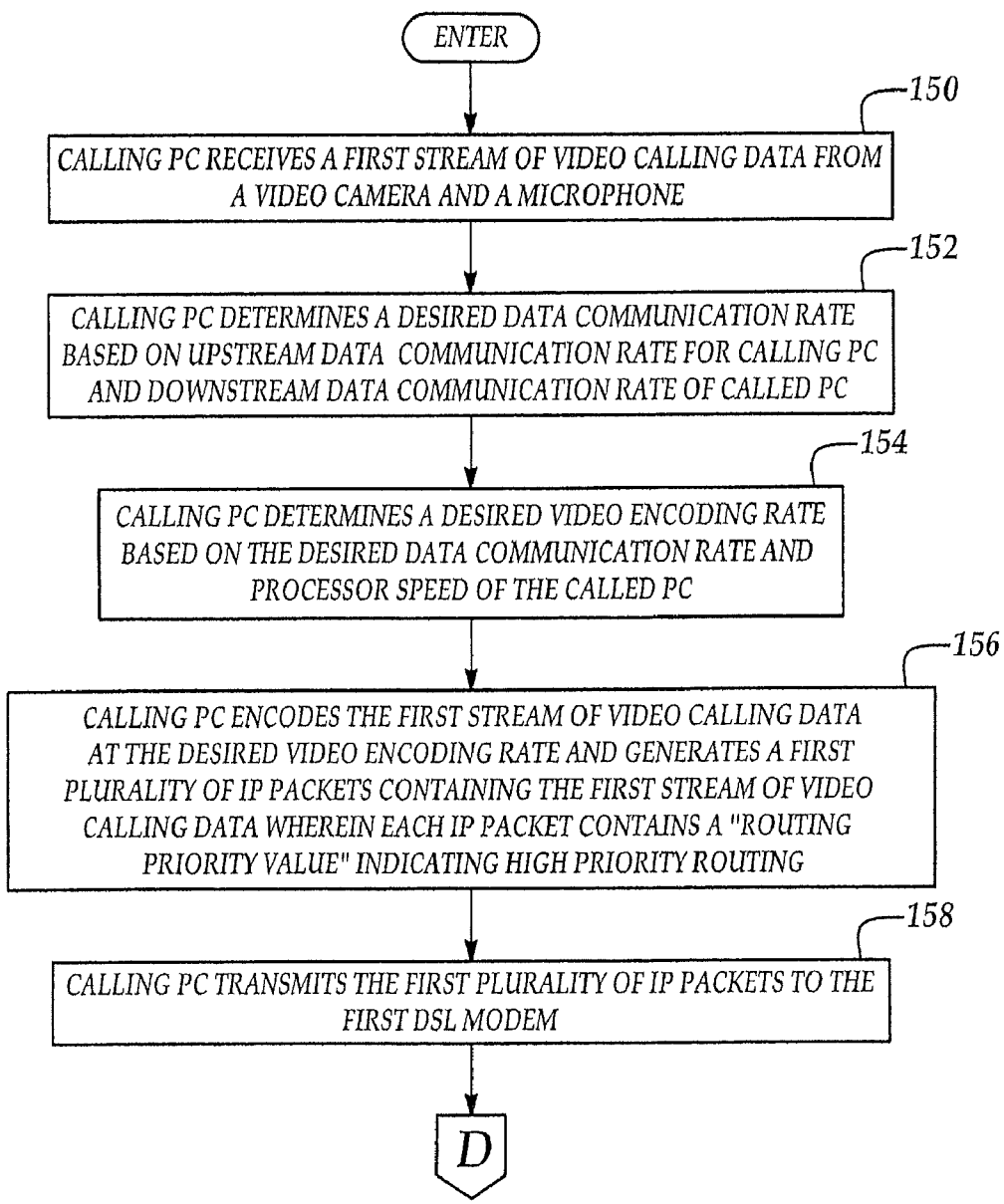
Figure 9B:
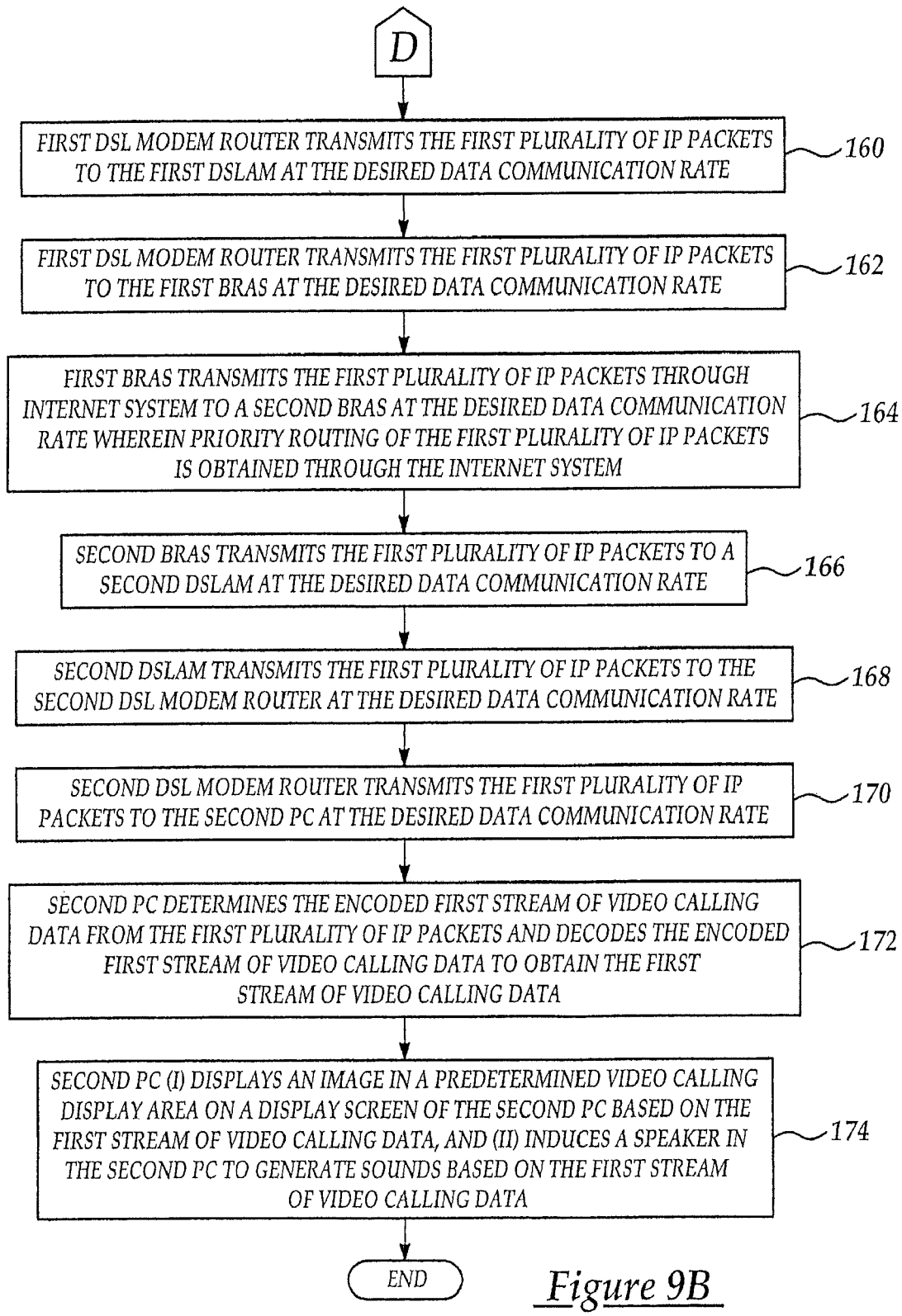

Referring to FIGS. 9A-9B, the steps for performing step 130 of PC 12 sending a first stream of video calling data to PC 36, will now be explained in further detail. At step 150, PC 12 receives a first stream of video calling data from video camera 14 and microphone 16.

At step 152, PC 12 determines a desired data communication rate based on an upstream data communication rate for PC 12 and a downstream data communication rate of PC 36.

At step 154, PC 12 determines the desired video encoding rate based on the desired data communication rate and the processor speed of PC 36.

At step 156, PC 12 encodes the first stream of video calling data at the desired video encoding rate and generates a first plurality of IP packets containing the first stream of video calling data. Each IP packet contains Priority Routing Bits indicating high priority routing.

At step 158, PC 12 transmits the first plurality of IP packets to DSL modem router 18.

At step 160, DSL modem router 18 transmits the first plurality of IP packets to DSLAM 22 at the desired data communication rate.

At step 162, DSL modem router 18 transmits the first plurality of IP packets to the BRAS 24 at the desired data communication rate.

At step 164, BRAS 24 transmits the first plurality of IP packets through Internet routing network 26 to BRAS 30 at the desired data communication rate wherein priority routing of the first plurality of IP packets is obtained through network 26.

At step 166, BRAS 30 transmits the first plurality of IP packets to DSLAM 32 at the desired data communication rate.

At step 168, DSLAM 32 transmits the first plurality of IP packets to DSL modem router 34 at the desired data communication rate.

At step 170, DSL modem router 34 transmits the first plurality of IP packets to PC 36 at the desired data communication rate.

At step 172, PC 36 determines the encoded first stream of video calling data from the first plurality of IP packets and decodes the encoded first stream of video calling data to obtain the first stream of video calling data.

Figure 6:
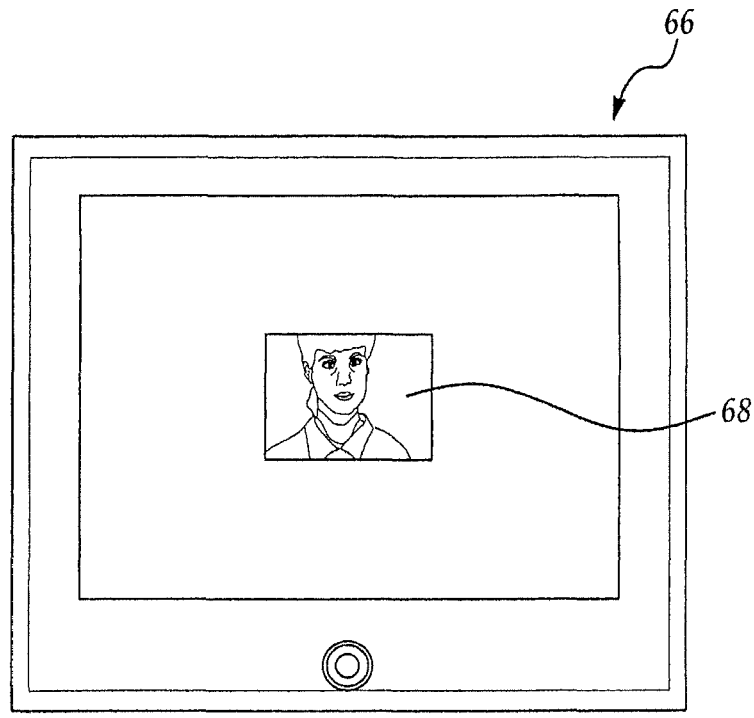
FIG. 6 is a schematic of a computer monitor having a video calling display area of 480×480 pixels.
Figure 7:
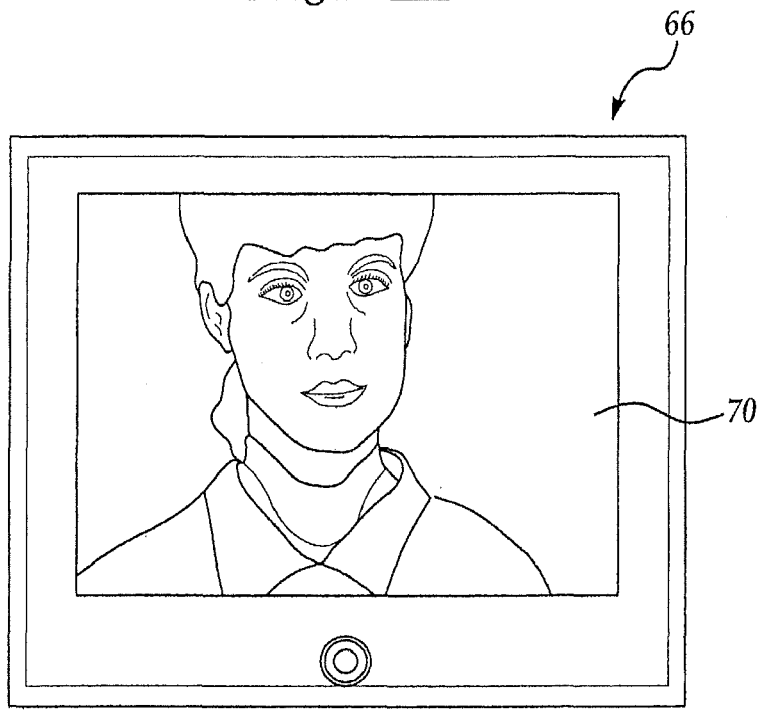
FIG. 7 is a schematic of a computer monitor having a video calling display area of 1600×1200 pixels.
Figure 8A:
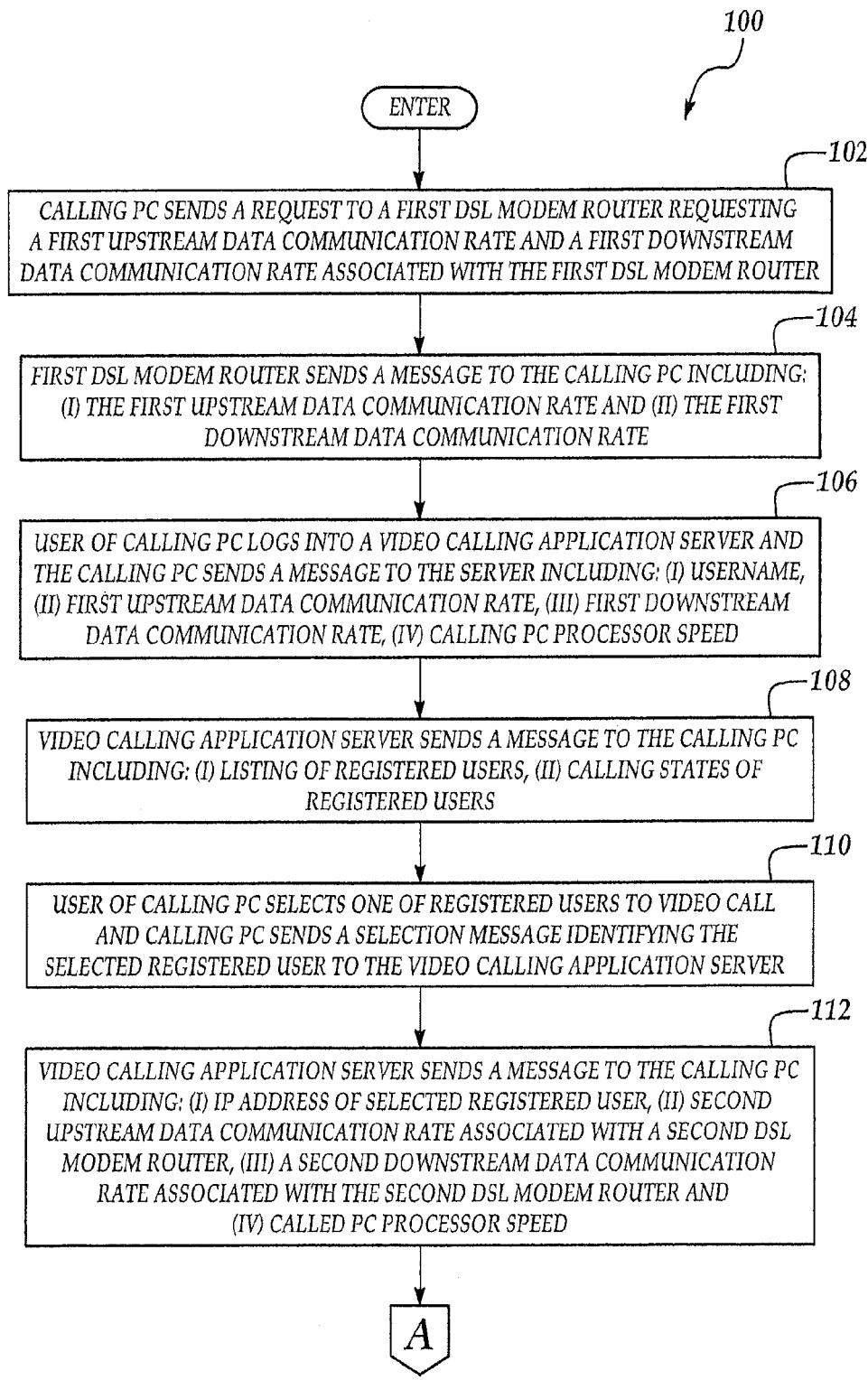
FIGS. 8A-8C and 9A-9B are flowcharts of a method for peer-to-peer video calling.
Figure 8B:
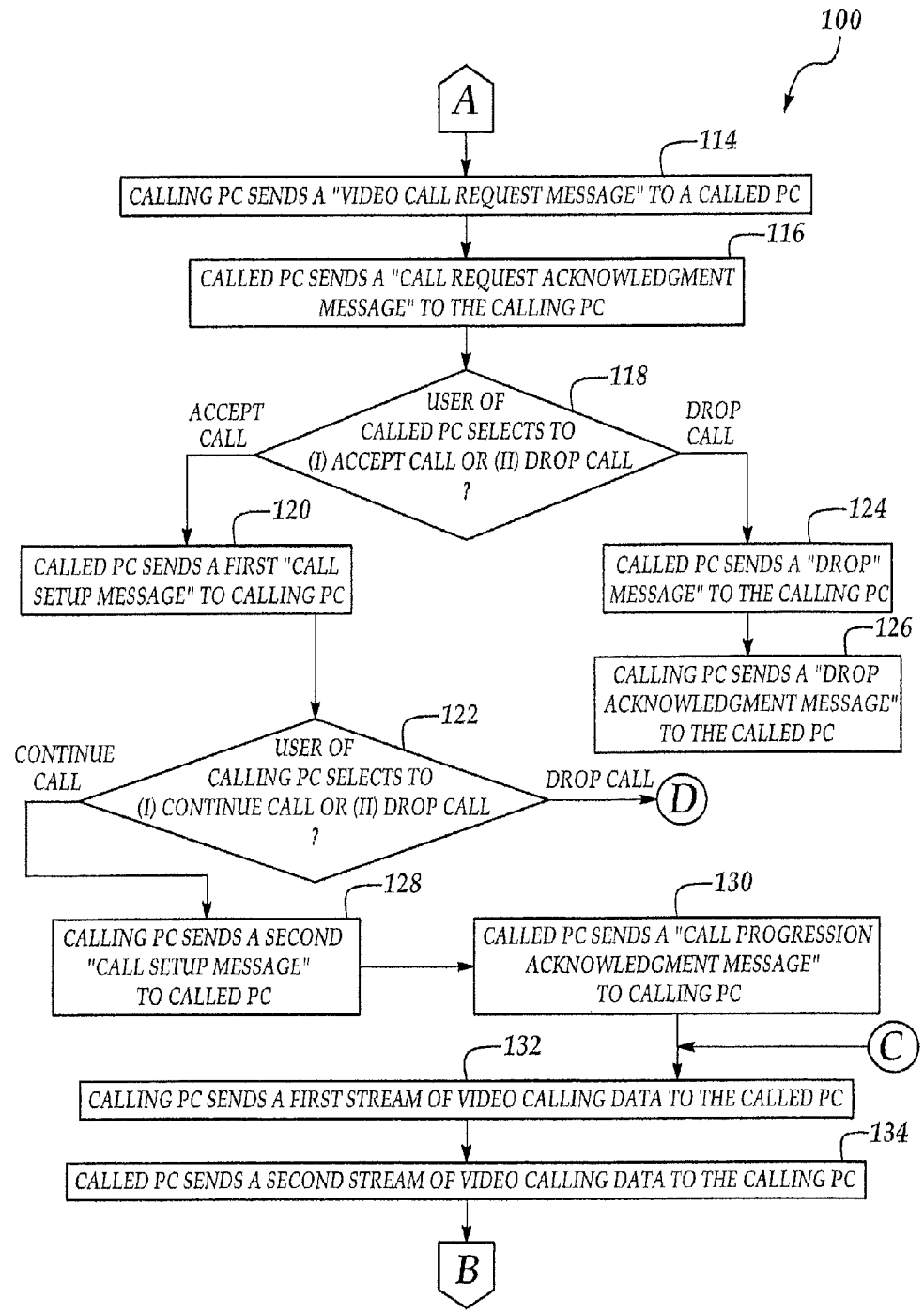
Figure 8C:
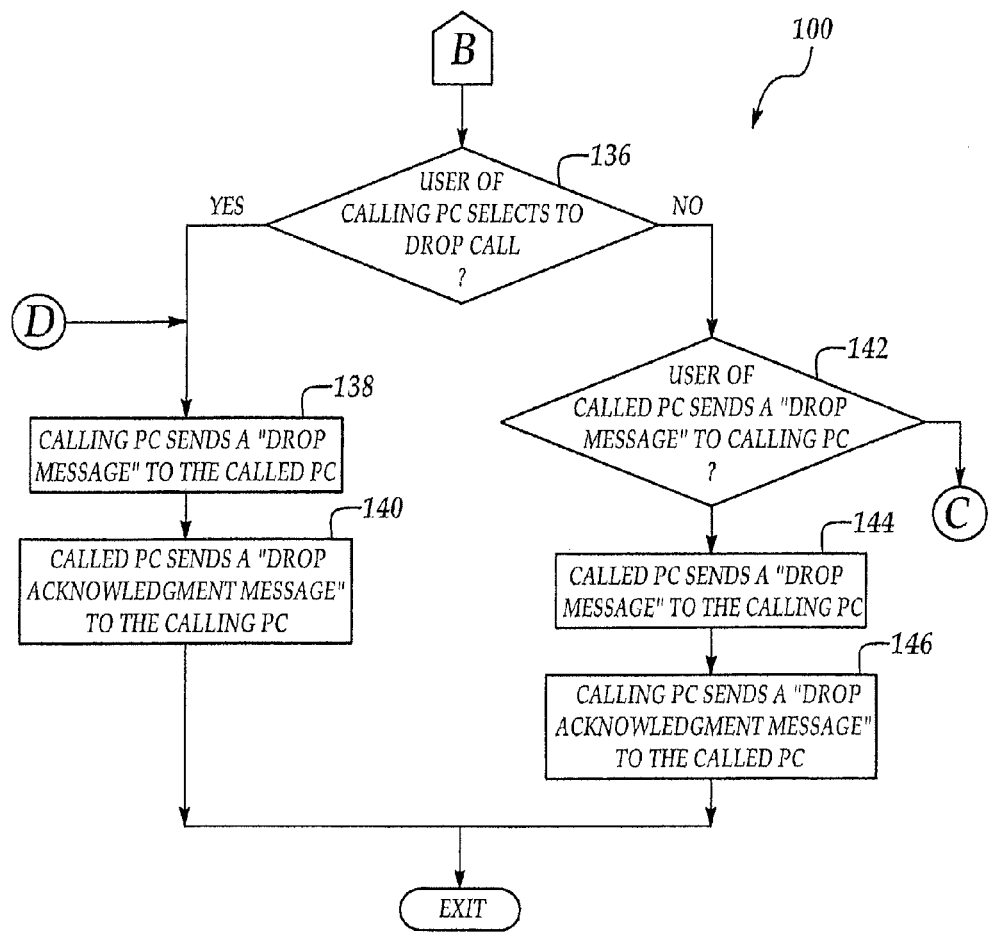

At step 174, PC 36 displays an image in a predetermined video calling display area on a display screen of PC 36 based on the first stream of video calling data. For example, referring to FIG. 6, if the desired data communication rate from PC 12 to PC 36 equals 300 Kbits/second, the video calling display area could be 480×480 pixels. Alternately, referring to FIG. 7, if the desired data communication rate from PC 12 to PC 36 equals 1.5 Mbits/second, the video calling display area could be increased to 1600×1200 pixels.

In an alternate embodiment of system 10, one or more cable modem network elements could be used instead of one or more DSL network elements, in system 10. In particular, one or more of DSL modem routers 18, 34 could be replaced with a cable modem. Further, one or more of BRAS 24, 30 could be replaced with a cable modem termination system (CMTS). Thus, for example, an alternate embodiment of system 10 could allow: (i) a DSL subscriber initiating a video call to a cable modem subscriber, (ii) a cable modem subscriber initiating a video call to another cable modem subscriber.

The present systems, methods, and storage medium for peer-to-peer video calling represent a substantial advantage over other systems and methods. In particular, the method determines a predetermined data communication rate through a communication network operatively coupled to PC 12 and PC 36. Thus, a calling PC can transmit information over the communication network at data communication rates that the communication network can adequately handle without delaying or dropping the streaming data. Accordingly, video calling data received by a receiving PC at the predetermined data communication rate is displayed in a continuous manner that is desirable for video calling applications. Thus, the method disclosed herein provides video calling images that are not "choppy" or discontinuous as compared to other methods. Further, the video calling data is tagged for high priority routing that enables the voice calling data to be transmitted through a communication network at substantially the desired data communication rate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for peer-to-peer video calling between a first device and a second device, comprising:
   determining a predetermined data communication rate by querying a communication network operably associated with the first device and the second device; and,
   transmitting video calling data from the first device through the communication network to the second device at substantially the predetermined data communication rate;
   wherein the determining the predetermined data communication rate includes the first device querying a first network device for a communication rate at the first device.

2. The method of claim 1 wherein the video calling data is transmitted at substantially the predetermined data communication rate for the duration of the transmission.

3. The method of claim 1 further comprising displaying the transmitted video calling data on a video display screen in the second device.

4. The method of claim 1 wherein the communication rate in the network comprises a maximum communication rate that can be maintained while transmitting video calling data between the first network device and a second network device in the communication network, the first network device communicating with the first device.

5. The method of claim 1 wherein the determining the predetermined data communication rate includes querying the first network device for a communication rate between the first network device and a third network device, the third network device being operatively coupled between the first network device and a second network device.

6. The method of claim 1 wherein the video calling data is transmitted including a data packet having a priority routing identifier in a portion of the communication network, the communication network providing priority routing of the data packet having the priority routing identifier.

7. The method of claim 1 further comprising encoding the video calling data at a predetermined video encoding rate based on a data processing speed of the second device and the predetermined data communication rate prior to transmission of the video calling data to the second device.

8. The method of claim 7 further comprising decoding the video calling data at the second device at a decoding rate determined from the data processing speed of the second device and the predetermined data communication rate.

9. The method of claim 8 further comprising adjusting a video calling display area on a display screen associated with the second device based on the decoding rate of the second device.

10. A peer-to-peer video calling system, comprising:
    a first device and a second device operatively communicating with one another through a communication network, the first device querying a first network device in the communication network to determine a predetermined data communication rate in the communication network, the first device configured to transmit video calling data through the communication network to the second device at substantially the predetermined data communication rate.

11. The peer-to-peer video calling system of claim 10 wherein the video calling data is transmitted from the first device through the communication network to the second device at substantially the predetermined data communication rate for the duration of the transmission.

12. The peer-to-peer video calling system of claim 10 wherein the transmitted video calling data is displayed on a video display screen in the second device.

13. The peer-to-peer video calling system of claim 10 wherein the communication rate in the network comprises a maximum communication rate that can be maintained while transmitting video calling data between the first network device and a second network device in the communication network, the first network device communicating with the first device.

14. The peer-to-peer video calling system of claim 10 wherein the first device queries the first network device for a maximum communication rate between the first network device and a third network device, the third network device being operatively coupled between the first network device and the second network device.

15. The peer-to-peer video calling system of claim 10 wherein the video calling data is transmitted including a data packet having a priority routing identifier, a portion of the communication network providing priority routing of the data packet having the priority routing identifier.

16. The peer-to-peer video calling system of claim 10 wherein the first device is further configured to encode the video calling data at a predetermined video encoding rate based on a data processing speed of the second device and the predetermined data communication rate, prior to the transmission of the video calling data to the second device.

17. The peer-to-peer video calling system of claim 16 wherein the second device is further configured to decode the video calling data at a decoding rate determined from the data processing speed of the second device and the predetermined data communication rate.

18. The peer-to-peer video calling system of claim 17 further comprising adjusting a video calling display area on a display screen associated with the second device based on the decoding rate of the second device.

19. A storage medium encoded with machine-readable computer program code for peer-to-peer calling between first and second devices operatively associated with a communication network, the storage medium including instructions for causing a first device operatively associated with the communication network to implement a method comprising:
    determining a predetermined data communication rate by querying the communication network operably associated with the first device and a second device; and,
    transmitting video calling data from the first device through the communication network to the second device at substantially the predetermined data communication rate;
    wherein the determining the predetermined data communication rate includes the first device querying a first network device for a communication rate at the first device.

* * * * *